United States Patent Office 3,265,466
Patented August 9, 1966

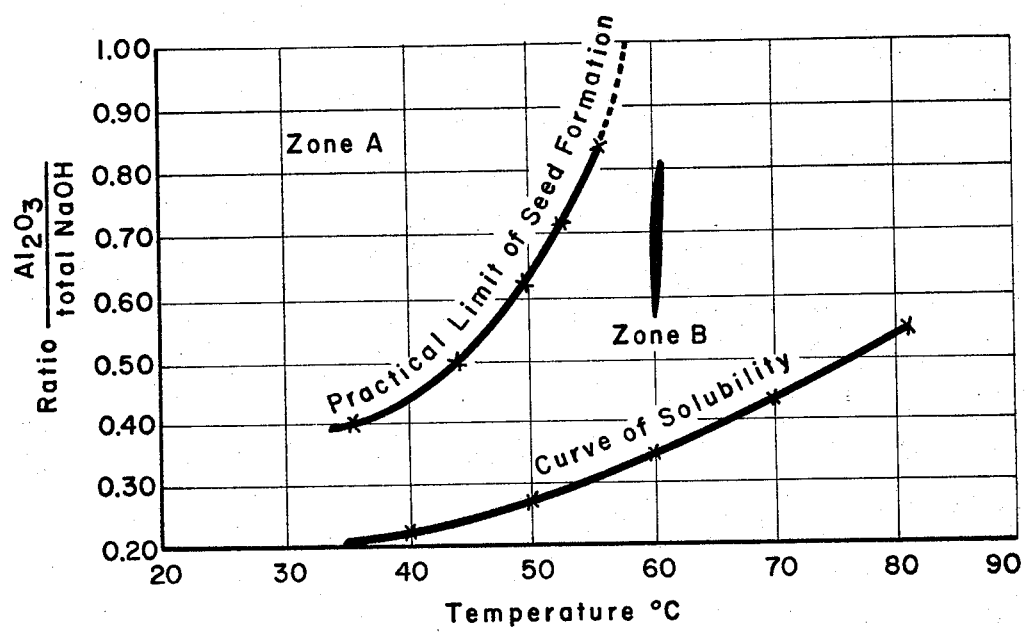

3,265,466
PROCESS FOR THE MANUFACTURE OF TRIHYDRATE OF ALUMINA
Paul Mollard, Sainte-Foy-Les-Lyon (Rhone), France, assignor to Societe d'Electro-Chimie d'Electro-Metallurgie et des Acieries Electriques d'Ugine, Paris, France, a corporation of France
Filed May 3, 1962, Ser. No. 192,171
Claims priority, application France, May 6, 1961, PV 861,008
9 Claims. (Cl. 23—143)

The present invention relates to the manufacture of trihydrate of alumina by the decomposition of sodium aluminate by the Bayer process in which seed crystals are used.

The alumina for use in the production of aluminum or refractory materials or corundum, is normally made from bauxite by the Bayer process.

The alumina contained in the bauxite is extracted by means of an aqueous solution of soda and alumina. This solution, supersaturated in alumina, is subjected to decomposition in the presence of seed crystals. During this operation the alumina separates from the solution in the form of hydrargillite or trihydrate $Al_2O_3 \cdot 3H_2O$.

The mechanics of this decomposition are not clear. The influence of various factors have been pointed out by numerous authors and borne out in industrial practice. The following factors in particular are considered, namely, the strength of the soda and alumina solution, the ratio of their strengths, the temperature and the nature and quantity of the seed crystals.

The seed crystal principle has been developed in recent years. It has long been accepted that the activity of these seed crystals is a function of the quantity of the grains of alumina in suspension in the aluminate solution to be decomposed, taking into account the granulation of these grains.

Subsequently efforts were made to obtain a large surface area of the seed crystals and, to this end, to select fine grains in the production of alumina for reintroduction as seed crystals.

This practice however had the disadvantage of having to employ large scale recycling (up to 400% of the alumina produced) and a sufficiently fine granulation (35 to 45 microns). The sizes of introduced seed crystals and of final product are closely similar, which, in view of the fineness of grain, involves difficulties in filtering, washing and calcination.

Different authors have conceived methods of preparing seed crystals with enhanced activity. For example, Eyraud has suggested cooling a solution of aluminate forcefully until it sets into a mass. On reheating this mass, micro-crystals of hydrargillite were obtained, which set up rapid decomposition of the solution of aluminate in which they are suspended. This process, however, requires a large and troublesome supplying of cooling agents.

Kuznetsov proposed a method of rapid formation of microcrystals of hydrargillite, in the aluminate solutions, in which partially dried fines of alumina, which have been freed of the gases of the calcination furnace and kept in suspension in the solution to be decomposed, are used for the formation of "seed crystals." As the original trihydrate obtained was too fine to be easily separated in a solid state, its suspension in an exhausted solution served as seed crystals for a new decomposition of solution rich in alumina, at the rate of 1 volume for 1 volume. This process, however, entails undesirable dilution.

However, industrial exploitation of the two last-named processes has not achieved the results anticipated.

Another technique consists in maintaining in a series of decomposers arranged in cascade, suspensions of trihydrate which are made to pass through the aluminate to be decomposed. In this process, the granulation is generally coarser than in the previous known processes. Into the first decomposer is periodically introduced a suspension of seed crystals which is obtained by agitating, for two or three days, warm solutions of aluminate of high alumina content in the presence of fines recovered in the decanters. This suspension contains very few fines smaller than one micron. Nevertheless, from time to time, an exaggerated formation of new fines smaller than one micron is produced in the decomposers when these seed crystals are periodically introduced. These fines clog the decanters, pass through the filters, and are drawn into the concentration circuit by evaporation. This formation of fines therefore constitutes a loss in productivity. The difficulty has not been overcome nor has it been possible to use these fines for seed crystals.

The main object of the present invention is to provide a process for preparing seed crystals with enhanced activity, called hereinafter "active seed crystals," for the production of alumina in which these aforesaid drawbacks may be minimized.

According to the present invention, a process for the production of trihydrate of alumina by decomposition of sodium aluminate by the Bayer process, comprises adding to a suspension of the aluminate during its decomposition active seed crystals of alumina trihydrate and fines formed of alumina trihydrate of smaller granulation than the final product, stirring the suspension at a speed which engenders agglomeration of the alumina trihydrate particles, the active seed crystals being prepared by placing alumina trihydrate produced by the Bayer process in the sodium aluminate solution at a temperature to cause the appearance, on the surface of the grains, of crystalline flakes having an indented form, allowing these flakes to grow to form more microcrystals which are easily detachable from the original crystals to form the active seed crystals therewith.

The method of applying this process varies as a function of the concentrations of alumina and soda, and according to the ratio of these concentrations in the aluminate solution. It is also a function of the temperature and the dimensions of the grains in the Bayer trihydrate at the start.

Experiments have shown that the invention could be applied to industrial solutions of sodium aluminate containing in addition sodium carbonate, sulphates, fluorines, iron, titanium, vanadium, organic materials and various other impurities.

It is known that, generally speaking, in the formation of a crystallized phase from a supersaturated solution, the number of crystalline seeds formed from the solution increases as the temperature falls, and having reached a maximum, decreases. This decrease, generally connected with the said diffusion occurrence, is commonly called the tempering effect.

The applicant has studied the formation of flaked seeds in the course of the decomposition of aluminate solutions up to concentrations of about 225 g./l. of the total NaOH, having ratios by weight of $Al_2O_3$/NaOH varying from 0.7 to 0.3. These are the conditions which may be used in the Bayer cycle.

Referring to the accompanying diagram, this shows temperature values along the abscissa and $Al_2O_3$/NaOH ratios along the ordinates, and illustrates on one hand the curve of solubility of alumina in soda at 225 g./l. as a function of temperature, and on the other, a curve which may be called "practical limit of seed formation." This second curve defines two zones A and B. Zone A corresponds to the abundant formation of flaked seeds in contact with grains of trihydrate. On the other hand, in zone B, the formation is very much less; moreover, the grains of trihydrate or the seeds have a tendency to increase in size.

By means of the invention, the active seed crystals are produced by introducing grains of trihydrate into solutions of aluminate within zone A in the diagram. It will then be noted, as herein expected, that flakes of trihydrate form in contact with these grains, the greatest dimensions of which are smaller than a micron and the thickness of which varies from 10 to 100 millimicrons. The crystals and the seeds are kept without stirring for a time lasting from some hours to six days according to the nature of the initial alumina and the original aluminate solution.

If trihydrate, treated in this manner, is used as active seed crystals with the normal conditions of the Bayer cycle, it will be seen that the decomposition of the aluminate is accelerated and the speed of decomposition can be multiplied three or four times compared with the speed obtained when using the standard methods.

Moreover, the quantity of seed crystals used then represents only an extremely small proportion, only a few percent of the production.

The curves in the diagram were made for a total concentration in soda of 225 g./l. For other concentrations which can likewise be used for the decomposition of aluminate solutions, the appearance of these curves remains the same, and it is possible to determine for each concentration of soda a zone A corresponding to the formation of seeds in contact with the grains of alumina trihydrate which form the active seed crystals.

Likewise, it is possible by means of the invention to use the seeds obtained at a given concentration of soda to hasten the decomposition of aluminate solutions of different concentrations in soda.

However, the introduction of active seed crystals, prepared for example in solutions of aluminate to be decomposed, brings about the appearance of trihydrate fines which, in the decomposers normally used, are entrained by the liquor before they have become sufficiently large. Moreover, using the technique described in French patent application No. 1,187,352, an improved process of producing alumina by decomposition of sodium aluminate by which the disadvantages connected with the large scale production of such fines at the time of decomposition, may be avoided. In carrying out said process, to a suspension of aluminate in course of decomposition, are added on the one hand active seed crystals prepared in particular as hereinafter described, and on the other, fines formed by trihydrate of a smaller granulation than that of the final product and obtained for example by crushing or drawing off from filters. Then this suspension is agitated under conditions and at a speed which enables particles of alumina to be agglomerated.

The rapid decomposition and an agglomeration of the particles (grains, seeds, and hydrate of alumina from the decomposition), are carried out in zone B of the accompanying diagram, whilst reducing as much as possible the formation of seeds.

The decomposers must be constructed so that an ascending current of aluminate maintains the agglomerates in suspension and enables them to be classified, the larger grains collecting in the bottom part from where they are extracted and form the final product.

When the working conditions are carefully regulated, the granulation shows a consistent reduction in size between the bottom and the top of the suspension.

The introduction of grains of trihydrate and the decomposition must be carried out in such a way that it is possible to obtain homogeneous granulation in the desired way and which may be of average size of between 40 and 250 microns.

The introduction of the seed crystals, which as anticipated hereinabove, is formed of active seed crystals and fines, may be carried out either continuously or intermittently at various levels in each decomposer.

Decomposition can be carried out either by introducing to the lower part of one decomposer solutions of aluminate concentrated in alumina and drawing off at the upper part thereof solutions which are then passed to be concentrated by evaporation, or by putting in operation a certain number of decomposers disposed in cascade, each apparatus then being employed for only part of the decomposition.

It is possible also to associate decomposers constructed to operate the process of the invention with standard decomposers, either at the end of the decomposition, which makes it possible to stop ultimate fines as required, or at the beginning of the decomposition, permitting rapid lowering of titration of the solution of aluminate due to the presence of seed crystals. However, all possible combinations of the two types of decomposers can be used.

The trihydrate obtained may be distinguished from the normal Bayer trihydrate by its dull appearance when seen through an optical microscope and by the irregular shapes of the agglomerates which are quite different from smooth and round grains found in the normal Bayer product. Furthermore, the granulation is much closer to a mean value, enabling the production of calibrated products capable for instance of a continuous and regular feed, to be obtained as an end product, either by calcination or by any other treatment.

The invention will now be described with reference to the following examples in which in Examples 1 and 2 the decomposition results in the formation of a fine final product, while in Examples 3, 4 and 5, the agglomeration is carried out at the same time as decomposition and a high average granulation results (80 microns).

*Example 1*

100 g. of Bayer trihydrate of alumina were added to 1 liter of sodium aluminate solution containing 225 g. of soda and 135 g. of alumina expressed as $Al_2O_3$. The temperature was maintained at 25° C. for three days without agitation. The total quantity of trihydrate of alumina in solid state was increased from 100 to 200 g. of which 100 g. was produced by decomposition. This suspension of active seed crystals was poured into a suspension formed of 40 kg. Bayer trihydrate in 100 liters of aluminate solution containing 225 g./l. of NaOH total and 158 g./l. of alumina $Al_2O_3$. In the course of decomposition, the temperature varied from 55 to 45° C. The medium was agitated. The content of alumina in the suspension was controlled and the operation stopped at the end of 30 hours when the content of $Al_2O_3$ in the suspension had reached 82 g./l., viz., a yield from decomposition of:

$$\frac{158-82}{158}=48\%$$

By way of comparison, the decomposition without the addition of active seed crystals in conformity with the invention, the remaining conditions being the same, would have lasted 95 hours. The speed of decomposition thus has more than tripled.

*Example 2*

An industrial solution of aluminate containing, per liter, 300 g. of soda and 225 g. of alumina expressed as $Al_2O_3$ was quickly cooled to between 20 and 25° C. To this solution was added 100 g. of trihydrate obtained from finely ground crusts from decomposers. At the end of 24 hours at 23° C. without agitation, the quantity of trihydrate in suspension rose from 100 to 130 g. of trihydrate and the solution only became exhausted by 20 g. in $Al_2O_3$.

A liter of this active seed crystals solution was introduced with agitation into 100 liters of aluminate containing 230 g./l. of NaOH and 165.5 g./l. of alumina $Al_2O_3$ in the presence of 45 kg. of Bayer trihydrate at a temperature regularly diminishing from 48 to 44° C. After 20 hours, it was noted that the solution had deposited 73 g./l. of alumina $Al_2O_3$, representing an extraction yield of:

$$\frac{73}{165.5}=44\%$$

At the end of 29 hours, this yield had reached 50%.

By way of comparison, this yield could not have been obtained under normal industrial conditions until after 98 hours of decomposition. The speed of decomposition, therefore, has again more than tripled.

*Example 3*

A decomposer 2.6 m. high and 50 mm. diameter, with a useful capacity of 5 liters, fitted with a blade stirring device, was continuously fed through the base by means of a solution of aluminate of high concentration (NaOH total 230 g./l.; $Al_2O_3$, 161 g./l.). The flow of liquid was maintained at 0.85 l./h.; its temperature at the inlet was 60° C. and at the outlet, 55° C.

The internal suspension was formed by a bed of 2000 g. of trihydrate formed at the base of grains of about 80 microns at 760 g./l. concentration. At 15 cm. below the top overflow, the granulation fell to 25–30 microns.

When the apparatus was in equilibrium, 110 g. of crushed trihydrate of a granulation <53 microns and 9 g. of active seed crystals prepared in the following manner, were introduced three times a day:

To 1 liter of a cold solution of sodium aluminate containing total NaOH 230 g./l.; $Al_2O_3$, 111 g./l., was added 300 g. of finely ground trihydrate, passing a sieve of 38 microns size. This suspension, unagitated and left at a temperature of 20° C. for 36 hours, formed the active seed crystals; it was put into the decomposer.

When the apparatus was regulated, 416 g. of trihydrate of the following granulation was extracted three times a day:

| Cumulative refuse, percent: | Microns |
|---|---|
| 0.1 | >150 |
| 10 | >100 |
| 50 | >80 |
| 80 | >70 |
| 90 | >60 |
| 99.5 | >50 | corresponding to 272 g. of $Al_2O_3$. Expressed in different units, production was 163 kg. of $Al_2O_3$ per day per m.$^3$ of apparatus. The composition of the solution of aluminate discharged was as follows:

| | G./l. |
|---|---|
| NaOH | 230 |
| $Al_2O_3$ | 122 |

In prior known production methods, the amounts produced are not greater than:

50 kg. $Al_2O_3$ per day per cubic meter of apparatus if an average granulation equivalent, viz. 80 microns is obtained.

100 kg. of $Al_2O_3$ per day per cubic meter of apparatus if the average granulation does not exceed 45 microns.

*Example 4*

Under the same conditions of mechanical operation as in Example 3, the same apparatus was fed with a solution of aluminate of low titration (NaOH total 230 g./l.; $Al_2O_3$, 100 g./l.). The flow of liquid was maintained at 0.9 l./h.; its temperature at the inlet was 52° C. and at the outlet, 49° C.

100 g. of crushed trihydrate of a granulation below 38 microns and 10 g. of active seed crystals identical to those of Example 3, were introduced per day.

The suspension inside the apparatus was maintained at the same granulation, in such a way that the product extracted at the base was about 80 microns. A production of 33 kg. of $Al_2O_3$ per day and per cubic meter of apparatus was regularly obtained.

The composition of the aluminate solution discharged was as follows:

| | G./l. |
|---|---|
| NaOH | 230 |
| $Al_2O_3$ | 92 |

In a standard production (not according to the invention), the yield is only 6 to 8 kg. per cubic meter per day of $Al_2O_3$.

*Example 5*

A pilot apparatus was used having a capacity of 20 cubic meters formed from a cylinder 10 m. high and 1.6 m. diameter, fitted with a stirrer with blades. This apparatus was fed with a solution of aluminate of average concentration (NaOH total 225 g./l.; $Al_2O_3$, 124 g./l.) at a temperature of 56° C. The temperature was 51° C. at the outlet. Three times a day, at regular intervals, there was added about 100 kg. of ground trihydrate, the granulometry of which was less than 53 microns, and 9 kg. of active seed crystals, prepared according to Example 3.

The flow of solution at the inlet was 1 cubic meter per hour, corresponding to a daily production of 1250 kg. of trihydrate of average diameter 80 microns, or 818 kg. expressed as $Al_2O_3$, namely 41 kg. per day per cubic meter of apparatus.

The composition of the aluminate solution obtained was as follows:

| | G./l. |
|---|---|
| NaOH total | 225 |
| $Al_2O_3$ | 90 |

In normal manufacture (not according to the invention), the production is only 13–14 kg. per day per cubic meter of $Al_2O_3$.

I claim:

1. A method for preparation of active seed crystals for use in decomposing sodium aluminate to obtain alumina trihydrate comprising adding grains of alumina trihydrate to a solution of sodium aluminate having a ratio by weight of $$\frac{Al_2O_3}{\text{total NaOH}}$$

of between about 0.30 and 0.7, maintaining said solution with said alumina trihydrate grains added thereto undisturbed at a temperature related to said ratio so as to form a zone on a graph of said ratio as ordinate and said temperature in °C. as abscissa, wherein said zone corresponds to zone A of the graph on the accompanying drawing, said maintaining said solution undisturbed being for a time sufficient to effect formation of flakes of alumina trihydrate in contact with said grains, and recovering said flakes which form said seed crystals, said flakes being smaller than a micron and having a thickness between about 10 to 100 millimicrons.

2. A process for the production of trihydrate of alumina by decomposition of sodium aluminate by the Bayer process, comprising adding active seed crystals to a suspension of alumina trihydrate fines in sodium aluminate solution, said fines being of smaller granulation than the final product, and stirring the suspension at a speed which engenders agglomeration of the fines, said active seed crystals being prepared by adding grains of alumina trihydrate to a solution of sodium aluminate having a ratio by weight of $$\frac{Al_2O_3}{\text{total NaOH}}$$

of between about 0.30 and 0.7, maintaining said solution with said alumina trihydrate grains added thereto undisturbed at a temperature related to said ratio so as to form a zone on a graph of said ratio as ordinate and said temperature in °C. as abscissa, wherein said zone corresponds to zone A of the graph of the accompanying drawing said maintaining said solution undisturbed being for a time sufficient to effect formation of flakes of alumina trihydrate in contact with said grains, said flakes being smaller than a micron and having a thickness between about 10 and 100 millimicrons, and recovering said flakes which form said seed crystals.

3. The process of claim 2 characterized by providing an upward flow of said sodium aluminate solution in decomposers and maintaining the agglomerate particles in suspension in said upward flow of said sodium aluminate solution to permit their classification.

4. A process according to claim 2, wherein the alumina trihydrate fines of smaller granulation than the final product are obtained by crushing crusts from decomposers.

5. A process according to claim 2, wherein the active seed crystals are introduced continuously into the decomposers at different levels.

6. A process according to claim 2, wherein the active seed crystals are introduced intermittently into the decomposers at different levels.

7. A process according to claim 2, wherein the sodium aluminate solution is introduced at the lower part of a decomposer and drawn off at the upper part thereof for transference to a process of concentration by evaporation.

8. A process according to claim 2, wherein a plurality of decomposers in cascade are employed, the solution being introduced at the lower part and drawn off from the upper part of each decomposer, only part of the process being effected in each decomposer.

9. The process of claim 2 wherein said trihydrate of alumina produced has a dull appearance when viewed through an optical microscope and wherein the aluminates thereof have irregular shapes.

References Cited by the Examiner
UNITED STATES PATENTS

| | | | |
|---|---|---|---|
| 1,943,786 | 1/1934 | Cowles | 23—143 |
| 2,657,978 | 11/1953 | Johnson | 23—143 |
| 2,707,669 | 5/1955 | Houston et al. | 23—143 |
| 2,935,376 | 5/1960 | Roberts | 23—143 |

OSCAR R. VERTIZ, *Primary Examiner.*

MAURICE A. BRINDISI, *Examiner.*

H. T. CARTER, *Assistant Examiner.*